US 8,549,482 B2

(12) United States Patent
Margalit et al.

(10) Patent No.: US 8,549,482 B2
(45) Date of Patent: Oct. 1, 2013

(54) DISPLAYING SUBTITLES

(75) Inventors: Gal Margalit, Mazor (IL); Ilan Meirman, Petah-Tikwa (IL); Dekel Tal, Gedera (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 365 days.

(21) Appl. No.: 12/969,378

(22) Filed: Dec. 15, 2010

(65) Prior Publication Data
US 2012/0159450 A1 Jun. 21, 2012

(51) Int. Cl.
*G06F 9/44* (2006.01)
(52) U.S. Cl.
USPC ............................ 717/125; 717/232; 717/255
(58) Field of Classification Search
USPC .................................. 717/125; 715/232, 255
See application file for complete search history.

(56) References Cited

U.S. PATENT DOCUMENTS

| 5,630,049 A | 5/1997 | Cardoza et al. |
| 6,138,252 A * | 10/2000 | Whitten et al. ................. 714/46 |
| 6,434,500 B1 | 8/2002 | Boehne et al. |
| 6,662,312 B1 | 12/2003 | Keller et al. |
| 7,064,759 B1 * | 6/2006 | Feierbach et al. ......... 345/469.1 |
| 7,096,416 B1 | 8/2006 | Smith et al. |
| 7,206,029 B2 * | 4/2007 | Cohen-Solal ................. 348/565 |
| 7,673,179 B2 * | 3/2010 | LaBanca et al. ........... 714/38.14 |
| 7,926,038 B2 * | 4/2011 | Rossi et al. ................... 717/126 |
| 2003/0070120 A1 * | 4/2003 | Michael et al. ................. 714/38 |
| 2005/0198053 A1 | 9/2005 | Seo et al. |
| 2006/0048100 A1 * | 3/2006 | Levy et al. ..................... 717/124 |
| 2007/0160342 A1 * | 7/2007 | Yoo et al. ......................... 386/83 |
| 2007/0201813 A1 | 8/2007 | Onoda |
| 2007/0208687 A1 | 9/2007 | O'Conor et al. |
| 2007/0300178 A1 * | 12/2007 | McArdle ....................... 715/781 |
| 2008/0244323 A1 | 10/2008 | Kelso |
| 2008/0270928 A1 | 10/2008 | Chakra et al. |
| 2009/0216557 A1 * | 8/2009 | Lawton et al. .................... 705/3 |
| 2010/0146445 A1 | 6/2010 | Kraut |
| 2011/0252405 A1 * | 10/2011 | Meirman et al. .............. 717/125 |
| 2011/0285726 A1 * | 11/2011 | Redmann ...................... 345/467 |

FOREIGN PATENT DOCUMENTS

JP 63180141 7/1988

OTHER PUBLICATIONS

Over Bryson, Hello World: Rational Manual Tester, IBM (Published Dec. 26, 2006).*
Microsoft Corporation, "Running Manual Tests Using Test Runner," http://msdn.microsoft.com/en-us/library/dd286725.aspx, retrieved online Oct. 27, 2010 (4 pages).
IBM, "Rational Quality Manager Standard Edition—Test Management and Quality Management for quality driven software delivery," http://www-01.ibm.com/software/awdtools/rqm/standard/, retrieved online Oct. 27, 2010 (4 pages).

* cited by examiner

*Primary Examiner* — Don Wong
*Assistant Examiner* — Theodore Hebert

(57) ABSTRACT

Example methods, apparatus and articles of manufacture to display subtitles are disclosed. A disclosed example method includes selecting a test script that corresponds to an application, and superimposing a subtitle bar including a test instruction from the test script over a portion of a display of the application within a user interface so that the subtitle bar reduces interference with viewing a region of interest of the display, wherein the test instruction provides an action a user is to perform to test the application.

20 Claims, 8 Drawing Sheets

FIG. 3

DISPLAYING SUBTITLES

BACKGROUND

Many software applications are tested by test engineers and/or developers prior to the applications being released. Testing a software application may uncover underlying issues within the application that a developer did not consider. Further, testing a software application helps ensure the application can function under different operating conditions.

BRIEF DESCRIPTION OF THE DRAWINGS

FIG. 3 shows the example user interface of FIG. 2 including the example subtitle bar of FIGS. 1 and 2 including an example test instruction and the application under test of FIGS. 1 and 2 including example text and example graphics.

DETAILED DESCRIPTION

Figure 1:
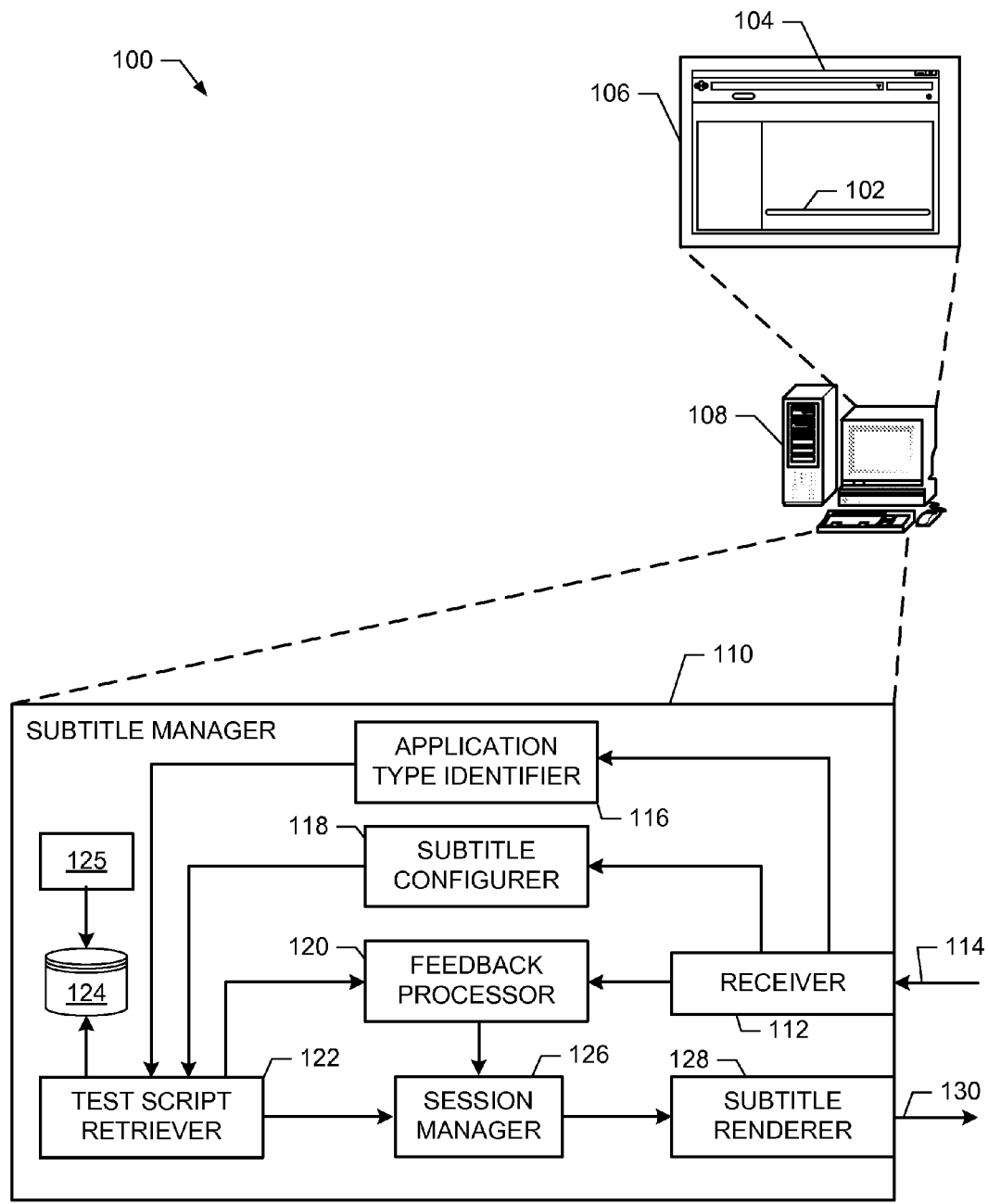
FIG. 1 is a schematic illustration of an example system constructed pursuant to the teachings of this disclosure to display subtitles superimposed over an application under test.

Test engineers and/or developers (e.g., testers or users) use test scripts to test software applications. Test scripts are instructions that describe an action to be performed by a tester. Test scripts are used to direct testers to perform one or more actions to test and/or debug any type of software application. An application that is tested by a tester is referred to herein as an application under test.

Test scripts are designed to test applications under varying conditions to simulate a range of possible usage scenarios. Test scripts may be designed to test operating functions of an application and/or the limits of the application. Known test scripts are created based on specifications, requirement documents, and/or other design documents that describe functionality associated with software applications. Test scripts may specify a pass condition and/or a fail condition. A pass condition defines under what circumstance(s) an application under test meets a requirement and/or specification for a certain action. A fail condition defines under what circumstance(s) an application under test does not meet a requirement and/or a specification for a certain action.

In known systems, testers use a second application (e.g., a test script application) to display test instructions. In these known systems, the test script application is separate and distinct from the application under test. Thus, a tester using a workstation (e.g., a computer) may view the application under test and the test script application in the same user interface (e.g., an operating environment of a computer). However, because the user interface has a finite size (e.g., limited by a displayable area of a computer monitor), a first portion of the user interface displays the application under test and a second portion of the user interface displays the test script application. In other examples, a tester may toggle between viewing the application under test and the test script application. For example, a tester may view an application under test in a full viewing mode to verify graphical elements of the application under test are properly displayed while hiding a test script application. A user can hide a test script application by, for example, closing the test script application, or reducing the test script application to a tab in a user interface.

Toggling between viewing the applications and/or moving the applications around within a user interface slows testing. Additionally, forcing a tester to toggle between applications may cause the tester to miss a test step and/or miss a test result from an action performed on the application under test. Further, because many test scripts include a full length description of an action to be performed on the application under test, many testers have to spend significant time reading the long test instruction.

Example methods, apparatus and articles of manufacture disclosed herein overcome these problems and improve the efficiency of software application testers by displaying test instructions within a subtitle bar superimposed over a relatively small portion of the application under test. Because the test instructions are displayed within a subtitle superimposed over an application under test, a tester is not required to toggle between applications and/or manipulate the viewable area of the applications. Further, because the test instructions are displayed within a subtitle bar superimposed over an application under test, the tester can view the test instructions while concurrently testing the application in a mode viewable within an entire user interface (e.g., a full screen mode).

Example methods, apparatus and articles of manufacture disclosed herein provide a relatively short synopsis of the actions to be preformed (e.g., one line of text). A tester may select the subtitle to view additional instructions if the tester needs more information. Further, a tester may configure the subtitles to be transparent and/or hidden from the view of the tester after a time period.

Example methods, apparatus and articles of manufacture disclosed herein monitor the application under test to determine when a tester has completed a test instruction displayed within a subtitle bar. After determining a test instruction has been completed, these example methods, apparatus and articles of manufacture disclosed herein determine a next test instruction and display the next test instruction within the subtitle bar. In other example methods, apparatus and articles of manufacture disclosed herein, the test instructions are changed based on commands by a tester. Example methods, apparatus and articles of manufacture disclosed herein may also make a record of testing progress of an application under test including, for example, recording completed tests, passed tests, and/or failed tests.

FIG. 1 shows an example system 100 constructed in accordance with the teachings of the disclosure to display a subtitle bar 102 superimposed over an application under test 104. The application under test 104 can be any type of software and/or firmware application including, for example, computer games, productivity tools, enterprise management applications, social networking functions, web pages, etc. that enables a user to perform any type of function on a computer. An example subtitle bar 102 is described and shown in detail in conjunction with FIGS. 2-5.

In the example of FIG. 1, the application under test 104 is displayed within a user interface 106. The example user 106 may be implemented by any hardware, software, and/or firmware components that enable a user of a workstation 108 to view and/or interact with the application under test 104. In the illustrated example, the workstation 108 includes an operating system and a display monitor. Additionally, the user interface 106 may include or be implemented by a software testing environment.

The example workstation 108 of FIG. 1 may be implemented by any type of computing device including, for example, a personal computer, a server, a laptop, a smartphone, a smartpad, etc. The example workstation 108 of FIG. 1 may be communicatively coupled to a network (e.g., the Internet, a Local Area Network, etc.) or, alternatively, may be used as an isolated testing processor. The workstation 108 enables a user (e.g., a tester) to execute (e.g., follow) a test script to test the application under test 104.

To display the subtitle bar 102 within the user interface 106, the workstation 108 of the illustrated example includes a subtitle manager 110. The example subtitle manager 110 coordinates the display of the subtitle bar 102 with actions performed by a tester on the application under test 104. The subtitle manager 110 interfaces with the application under test 104 to change text displayed within the subtitle bar 102 as actions are performed by a tester on the application under test 104. In other examples, the subtitle manager 110 receives commands from a tester to display test instructions within the subtitle bar 102.

While the example subtitle manager 110 of FIG. 1 is shown as being included within the workstation 108, in other examples, the subtitle manager 110 may be included within a separate processor communicatively coupled to the workstation 108. In yet other examples, the subtitle manager 110 may be included within the application under test 104 as an application specific test manager. Further, while the example subtitle manager 110 shown in FIG. 1 manages the display of the subtitle bar 102 for the application under test 104, the workstation 108 may instantiate multiple versions of the subtitle manager 110 for each application under test displayed within the user interface 106 and/or other user interfaces.

To receive a selection of the application under test 104 and/or commands from a tester, the example subtitle manager 110 of FIG. 1 includes a receiver 112. The example receiver 112 is communicatively coupled to the workstation 108 and/or the application under test 104 via a communication bus 114. The communication bus 114 may include any type of wired and/or wireless communication medium.

The example receiver 112 receives an indication identifying the application under test 104 after a tester has initiated the application under test 104 on the workstation 108. The indication may include, for example, an identifier of the application under test 104, a type of the application under test 104, metadata associated with the application under test 104, and/or any other information that the subtitle manager 110 may use to identify the application under test 104.

The example receiver 112 of FIG. 1 also receives commands from a tester. The commands may instruct the subtitle manager 110 to change an appearance of the subtitle bar 102, change a location of the subtitle bar 102 within the user interface 106, cycle through test instructions displayed by the subtitle bar 102, switch from a synopsis to a detailed test instruction, and/or provide feedback from tests performed on the application under test 104.

The example receiver 112 of FIG. 1 routes any received information to an appropriate block within the subtitle manager 110. For example, the receiver 112 of the illustrated example routes an indicator of the application under test 104 to an application type identifier 116. The example receiver 112 of FIG. 1 routes commands to change an appearance of the subtitle bar 102 to a subtitle configurer 118. Further, the receiver 112 of the illustrated example routes to a feedback processor 120 commands to cycle to a next instruction and/or commands associated with results from the application under test 104.

The application type identifier 116 of the illustrated example parses indications of a selection of the application under test 104 for identification information. The application type identifier 116 may search for an identifier of the application under test 104 within metadata associated with the application under test 104 and/or within an instruction from the workstation 108 indicating the application under test 104 is selected. In other examples, the application under test 104 and/or the user interface 106 may transmit a message to the application type identifier 116 including an identifier of the application under test 104 upon the application 104 being opened within the user interface 106.

After determining an identifier of the application under test 104, the example application identifier 116 transmits the identifier to a test script retriever 122. The test script retriever 122 uses the identifier to select a corresponding test script located within a test script database 124. A test script is created by designers and/or testers based on design specifications and/or requirement documents associated with the application under test 104. In some examples, the test script may be automatically generated by a test script generator 125 based on an aggregation of requirements for the application under test 104. Alternatively, the test script generator 125 may generate a test script based on a requirements specified within a requirement tracking tool.

In the illustrated example, each test script includes one or more test instructions that describe how a respective application under test 104 is to be tested. Each such test instruction may include a synopsis, a full description, pass conditions, fail conditions, and/or troubleshoot procedures. The test instructions may be sequenced within the test script or, alternatively, may be linked together based on results from the application under test 104 (such results may be in response to a tester following one or more test instructions). A test script may also include a tracking section to record when the test script was last executed and/or any documented results from the application under test 104.

Additionally, a test script may include properties (e.g., settings) describing how test instructions within the test script are to be displayed within the subtitle bar 102. For example, a test script may include a font color and/or font size indicator. The test script may also include a location indicator and/or a transparency indicator. Further, a test script may include an auto-hide delay function that removes, for example, the subtitle bar 102 from view of a tester after a specified time period (e.g., a few seconds). In the illustrated example, test scripts may be used to test a single application or may be used to test different applications. Thus, the properties of the test script may be set to configure the instructions of the test script to be displayed differently based on which application is tested.

In the example of FIG. 1, the test script database 124 is shown as being included within the subtitle manager 110. However, in other examples, the test script database 124 may be communicatively coupled to the subtitle manager 110, either within or external to the workstation 108. The test script database 124 may be implemented by, for example, storage disk(s) disk array(s), tape drive(s), volatile and/or non-volatile memory, compact disc(s) (CD), digital versatile disc(s) (DVD), floppy disk(s), read-only memory (ROM), random-access memory (RAM), programmable ROM (PROM), electronically-programmable ROM (EPROM), electronically-erasable PROM (EEPROM), optical storage disk(s), optical storage device(s), magnetic storage disk(s), magnetic storage device(s), cache(s), and/or any other storage media in which data is stored for any duration.

The example test script retriever 122 of FIG. 1 uses an identifier associated with the application under test 104 to search the test script database 124 for a matching test script. To locate a matching test script, the test script retriever 122 searches headers and/or metadata within test scripts that indicate whether the test script corresponds to the application under test 104. After locating a matching test script, the test script retriever 122 transmits the test script (or a copy of the test script) to a session manager 126.

The session manager 126 of the illustrated example configures test instructions from a test script to be displayed within, for example, the subtitle bar 102. The example session manager 126 manages which test instruction is displayed and/or manages how the subtitle bar 102 is to be displayed. In examples where the subtitle manager 110 is to display a subtitle bar for multiple applications under test, the example session manager 126 manages which instructions from which test script is displayed within the appropriate application. For each test script, the example session manager 126 of FIG. 1 creates a session and determines how the subtitle bar 102 is to be displayed based on properties defined within the test script. In other examples, the session manager 126 may receive display property information from the tester via the user interface 106. The session manager 126 uses the properties to configure dimensions and text properties for the corresponding subtitle bar 102.

The example session manager 126 of FIG. 1 also determines a location within the user interface 106 at where the subtitle bar 102 is to be displayed. In some examples, the location of the subtitle bar 102 is specified within the properties of the corresponding test script. In other examples, the session manager 126 determines the location based on available space within the application under test 104. The session manager 126 of the illustrated example determines a location for the subtitle bar 102 so that the bar 102 reduces (and/or in some examples, eliminates) interference with a tester viewing the application under test 104.

For example, an application under test 104 may display text and graphics. The session manager 126 of the illustrated example receives and/or requests a screen shot of the user interface 106 displaying the application 104. After receiving a screen shot of the application under test 104 displayed within the user interface 106, the session manager 126 analyzes the screen shot using imaging processing tools to search for empty, substantially empty, sparsely populated, and/or void spaces. An empty and/or void space may include an area of the displayed application under test 104 that does not include text and/or graphics. A substantially empty or sparsely populated area includes relatively less text and/or fewer graphics than other portions of the application under test 104. After locating a substantially empty, sparsely populated, empty and/or void location, the session manager 126 specifies that the subtitle bar 102 is to be placed within the identified location of the application under test 104. In examples where the application under test 104 includes an allocation of text and/or graphics across the screen shot, the session manager 126 determines that the subtitle bar 102 is to be displayed along the bottom of the user interface 106. Thus, placement of the subtitle bar 102 at the bottom of the screen may be thought of as a default placement.

In examples where a test script has a property and/or a setting that specifies the subtitle bar 102 is to be removed and/or hidden from view after a time period, the example session manager 126 of FIG. 1 determines when the subtitle bar 102 is to be removed from the user interface 106. Upon a request by a tester to again view the subtitle bar 102 (e.g., moving a mouse cursor over the location of the hidden subtitle bar 102), the session manager 126 reactivates (e.g., displays) the subtitle bar 102.

To generate a display of the subtitle bar 102, the example subtitle manager 110 of FIG. 1 includes a subtitle renderer 128. The example subtitle renderer 128 is communicatively coupled to the user interface 106 via a communication path 130, which may include any wired and/or wireless communication medium. The subtitle renderer 128 uses configuration information from the session manager 128 to render, for example, the subtitle bar 102 for display within the user interface 106.

To render the subtitle bar 102, the example subtitle renderer 128 uses display settings and/or properties to determine a height, a width, and/or color(s) for the subtitle bar 102. The subtitle renderer 128 uses font information to generate text (e.g., test instructions) overlying the subtitle bar 102. The subtitle renderer 128 uses transparency setting information to configure a transparency of the subtitle bar 102. With the transparency setting appropriately set, under the subtitle bar 102 a tester is able to view the displayable area of the application under test 104.

Further, the subtitle renderer 128 uses display location information determined by the session manager 126 to place the subtitle bar 102 at an appropriate location within the user interface 106. In this manner, the example subtitle renderer 128 superimposes the subtitle bar 102 over the application under test 104 at a location determined to reduce interference with using the application under test 104 and/or the expected result. The example subtitle renderer 128 also displays the test instructions as text within and/or over the subtitle bar 102. By displaying the test instruction superimposed over a relatively small portion of the displayable area of the application under test 104, a tester can read an instruction from the subtitle bar 102 while performing the action indicated by the instruction on the application 104, thereby improving the efficiency of the tester.

To enable a tester to configure how the subtitle bar 102 is to appear, the subtitle manager 110 of the illustrated example includes the subtitle configurer 118. The example subtitle configurer 118 receives commands from the receiver 112 generated by a tester and retrieves a corresponding test script via the test script retriever 122. The example subtitle configurer 118 then parses the commands by a setting and/or property and stores each setting and/or property to the test script. In examples where the test script includes a preconfigured display setting, the subtitle configurer 118 overwrites and/or adjusts the setting and/or property with the setting and/or property provided by the tester.

In some examples, a tester may adjust a display setting of, for example, the subtitle bar 102 while the bar 102 is being displayed. In these examples, the subtitle configurer 118 adjusts the display setting based on the property selected by the tester, stores the setting to the test script via the test script retriever 122, and sends an instruction to the session manager 126 to reread the test script with the updated display setting. After receiving the instruction, the session manager 126 rereads the test script and accordingly adjusts the display of the subtitle bar 102.

To manage which test instruction is to be displayed, the example subtitle manager 110 of FIG. 1 includes the feedback processor 120. The example feedback processor 120 receives command instructions from the tester via the user interface 106. A tester may manually cycle through test instructions using, for example, a keyboard and/or a mouse. The feedback processor 120 receives the command from the tester, retrieves the appropriate test script to determine a test instruction corresponding to the command, and sends the determined test instruction to the session manager 126 to display within the subtitle bar 102. For example, a tester may provide a command to view a next test instruction. In this example, the feedback processor 120 determines the currently displayed test instruction (e.g., via the session manager 126) and identifies the subsequent test instruction in a test instruction sequence specified within a corresponding test script. The feedback processor 120 then sends an instruction to the session manager 126 to display the subsequent test instruction.

The feedback processor 120 also processes test feedback information received from a tester and/or the application under test 104. Test feedback information may include, for example, indications that a test instruction was performed, indications that a test instruction passed or failed, and/or results of a test instruction. For example, a tester may provide a command describing a result of a test (e.g., by moving a mouse to click a selection or typing I the result with a keyboard). After receiving the command with the description, the example feedback processor 120 creates or updates a test results log within the corresponding test script. The feedback processor 120 may also link the results to the associated test instruction within the test script. Further, the feedback processor 120 may manage a toolbar displayable in conjunction with the subtitle bar 102 that a tester may use to enter feedback information (e.g., commands that include a description of a result from a test instruction) and/or perform actions on the test instructions. In this manner, a tester may access a test script to view test results and/or determine which of the test instructions have been performed.

The example feedback processor 120 of the illustrated example also monitors and/or receives feedback from the application under test 104. The feedback may include, for example, an indication that a tester has performed an action directed by a test step. If the feedback processor 120 detects that a result of a test did not match a passing condition, the feedback processor 120 may transmit troubleshoot instructions and/or procedures stored in the test script to the session manager 126 to display within the user interface 106 in association with the subtitle bar 102. The feedback may also include results of an action of a tester as measured and/or quantified by the application under test 104. In this manner, the feedback processor 120 automatically logs test results and/or updates test instructions displayed with the subtitle bar 102 based on information received from the application 104 and/or the user interface 106.

For example, the feedback processor 120 may receive feedback from the application under test 104 that a certain link was selected by a tester. The example feedback processor 120 determines that the selected link is associated with a currently displayed test instruction that directs the tester to select the link. Because the tester correctly performed the test instruction, the feedback processor 120 records (e.g., in a corresponding test script) that the test instruction was performed and determines a next test instruction. The next test instruction may be a next test instruction in a sequence and/or may be a test instruction to be performed upon the successful completion of the current test instruction. The feedback processor 120 then stores the test script, including the test results, to the test script database 124, and sends an instruction to the session manager 126 with the next test instruction to display within the subtitle bar 102.

While an example manner of implementing the example system 100 has been illustrated in FIG. 1, one or more of the elements, processes and/or devices illustrated in FIG. 1 may be combined, divided, re-arranged, omitted, eliminated and/or implemented in any other way. Further, the example workstation 108, the example user interface 106, the example subtitle manager 110, the example receiver 112, the example application type identifier 116, the example subtitle configurer 118, the example feedback processor 120, the example test script retriever 122, the example test script database 124, the example session manager 126, the subtitle renderer 128 and/or, more generally, the example system 100 of FIG. 1 may be implemented by hardware, software, firmware and/or any combination of hardware, software and/or firmware. Thus, for example, any or all of the example workstation 108, the example user interface 106, the example subtitle manager 110, the example receiver 112, the example application type identifier 116, the example subtitle configurer 118, the example feedback processor 120, the example test script retriever 122, the example test script database 124, the example session manager 126, the subtitle renderer 128 and/or, more generally, the example system 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example workstation 108, the example user interface 106, the example subtitle manager 110, the example receiver 112, the example application type identifier 116, the example subtitle configurer 118, the example feedback processor 120, the example test script retriever 122, the example test script database 124, the example session manager 126, and/or the subtitle renderer 128 are hereby expressly defined to include a computer readable medium such as a memory, DVD, CD, Blu-ray disc, etc. storing the software and/or firmware. Further still, the system 100 of FIG. 1 may include one or more elements, processes and/or devices in addition to, or instead of, those illustrated in FIG. 1, and/or may include more than one of any or all of the illustrated elements, processes and devices.

Figure 2:
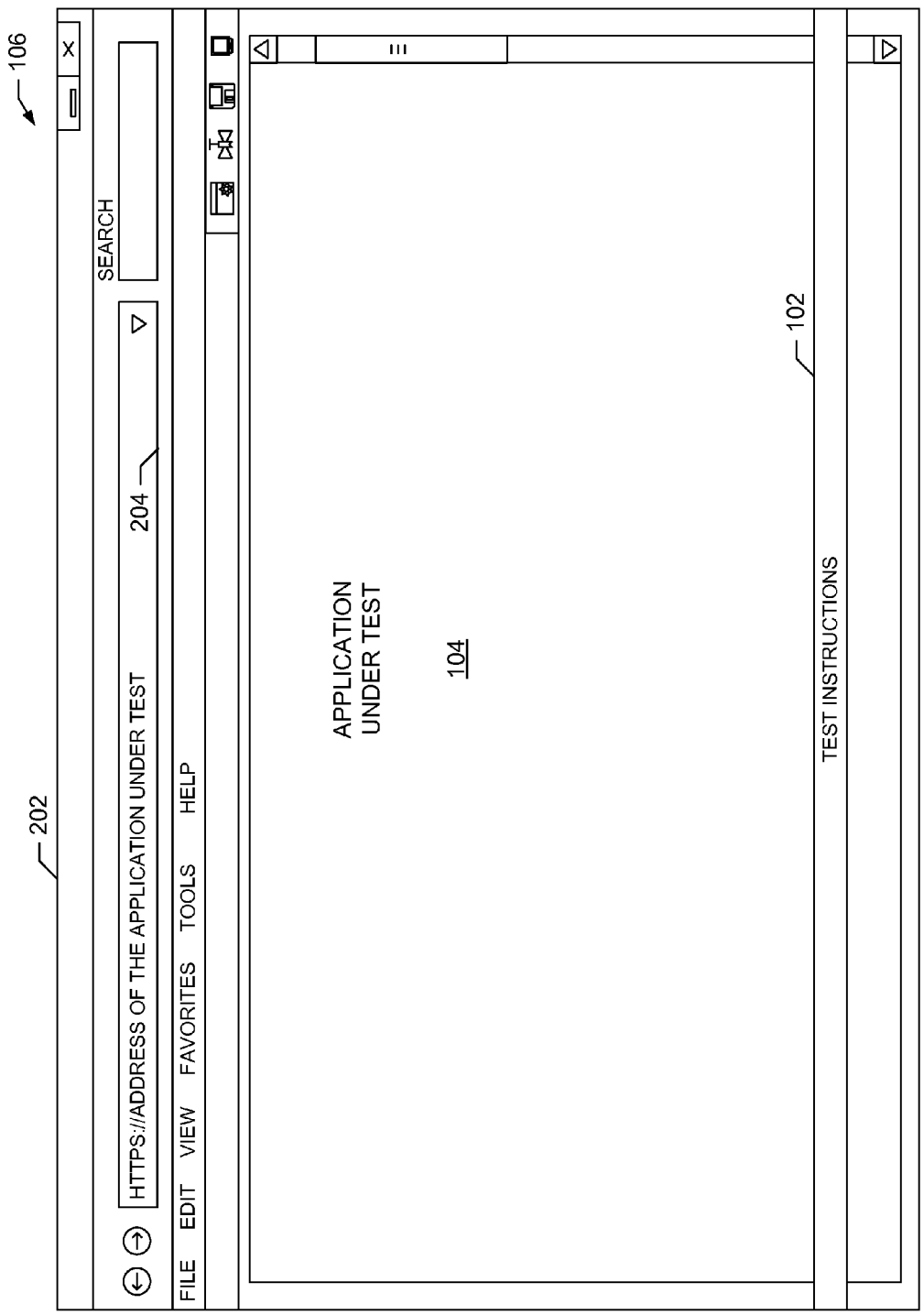
FIG. 2 shows an example user interface displaying the application under test and the subtitle bar of FIG. 1.

FIG. 2 illustrates an example user interface 106 displaying an example application under test 104 and an example subtitle bar 102. For clarity in this example, the application under test 104 and the subtitle bar 102 do not include text, graphical representations of data, and/or pictures. Instead, another example application under test 104 is shown with text and graphics in FIGS. 3 and 4. Similarly, another example subtitle bar 102 is shown with text in FIGS. 3 and 4.

In the example of FIG. 2, the user interface 106 includes a web browser 202 to display the application under test 104. The web browser 202 may be implemented by any type of web browser. In other examples, the user interface 106 may include an application programming interface (API) and/or any other interface to view the application under test 104. In this example, the web browser includes a navigation bar 204, which displays a file location of the application under test 104. A tester enters a web address shown in the navigation bar 204 to cause the web browser 202 to navigate to the application under test 104. In other examples, a tester may access the application under test 104 via a file open function.

In the illustrated example, the subtitle bar 102 is shown at a lower portion of the application under test 104, thereby enabling a tester to view substantially all of the application under test 104 within the user interface 106. In other examples, the subtitle bar 102 may be superimposed over a portion of the application under test 104 that is sparsely populated and/or void of any text and/or graphics. In yet other examples, a tester may manually move the subtitle bar 102 (e.g., with a point and client input device) to a desired location within the user interface 106.

To reduce an amount of area used by the subtitle bar 102, the example subtitle manager 110 of FIG. 1 reduces a height of the subtitle bar 102 so that only one line of text is displayed. In this example, the one line of text provides a short synopsis of a test instruction that a tester is to perform in the application under test 104. In this example, the height of the subtitle bar 102 is about one fifteenth (1/15) of the height of the portion of the application under test 104 displayed in the user interface 106. Further, while the subtitle bar 102 is shown extending to a width of the user interface 106, in other examples, the subtitle bar 102 may include a shorter width.

Figure 3:
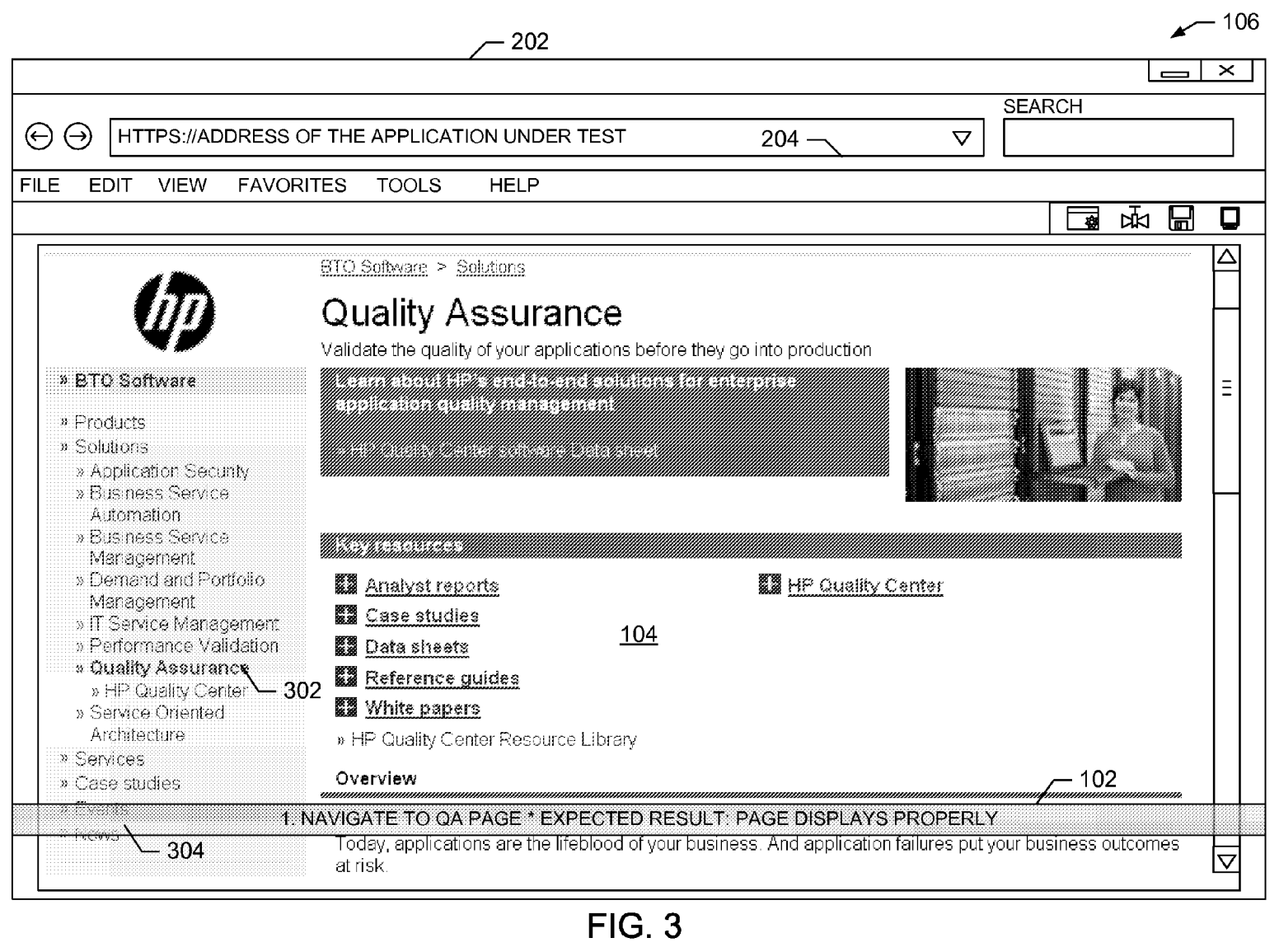

FIG. 3 illustrates the example user interface 106 of FIGS. 1 and 2 including a different example subtitle bar 102 with an example test instruction and a different example application under test 104 with text and graphics. In this example, a tester navigates to a web page located at the web address specified within the navigation bar 204, thereby causing the application under test 104 (e.g., a web page) to be displayed within the user interface 106. When the example subtitle manager 110 of FIG. 1 detects that the application under test 104 is open in the user interface 106, it searches for a corresponding test script. After the subtitle manager 110 identifies a corresponding test script, it identifies a first test instruction from the test script and displays the subtitle bar 102 with the first test instruction (e.g., 1. Navigate to QA Page). In the example of FIG. 3, the subtitle manager 110 also displays the expected result (e.g., Page Displays Properly) within the subtitle bar 102.

A tester can read the test instruction within the subtitle bar 102 and select the "Quality Assurance" (i.e., "QA") link 302 within the application under test 104. If the tester can view the Quality Assurance web page, the tester knows, via the subtitle bar 102, that the test instruction was performed as expected by the application under test 104. A tester may then prompt the subtitle bar 102 to display the next test instruction (e.g., by selecting the subtitle bar 102 with appoint and click device). In other examples, the subtitle manager 102 automatically detects that the Quality Assurance page is displayed according to the test instruction, determines a next test instruction, and display the next test instruction within the subtitle bar 102.

Because the subtitle bar 102 of the illustrated example is relatively small compared to the area of the application under test 104, the tester can view the text and graphics of the application under test 104 without having to move the subtitle bar 102. In this example, the subtitle bar 102 is partially transparent, thereby enabling a tester to view portions of the application under test 104 that are behind the subtitle bar 102. For example, "Events" and "News" links 304 are viewable by a tester through the partial transparency of the subtitle bar 102. Additionally, while the subtitle bar 102 is displayed towards the bottom of the application under test 104, in other examples, the subtitle manager 110 may locate the subtitle bar 102 over a portion of the application under test 104 that does not include any text and/or graphics.

Figure 4:
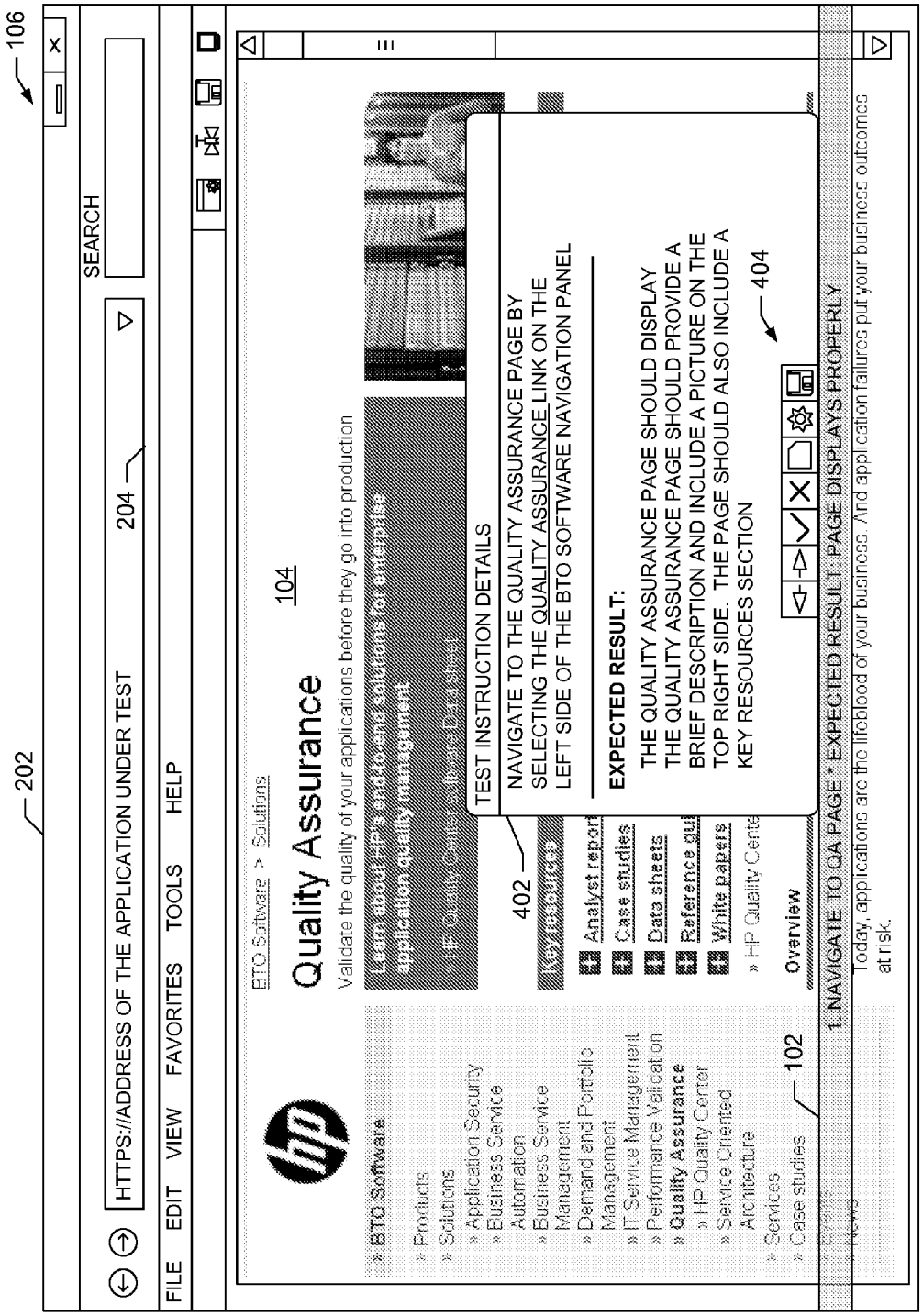
FIG. 4 shows the example user interface of FIGS. 1-3 with a test instruction panel.

FIG. 4 illustrates the example user interface 106 of FIGS. 1-3 including the example application under test 104 and the example subtitle bar 102 shown with an example test instruction panel 402. In this example, a tester has clicked on the subtitle bar 102 with a point and click input device, causing the subtitle manager 110 of FIG. 1 to render the example test instruction panel 402 with additional test information as shown in FIG. 4. The example test instruction panel 402 of FIG. 4 includes additional test information to more fully instruct a tester to perform the test instruction specified within the subtitle bar 102. The test instruction 402 also includes a description of a result to be expected when the tester executes the test instruction.

A tester may open the test instruction panel 402 in instances when the tester needs more information to perform a test and/or when the tester needs more information regarding an expected result. After viewing the information within the panel 402, the tester may close the panel 402 and continue to test the application under test 104. In this manner, the subtitle manager 110 only displays additional test information when the information is requested by the tester.

The example test instruction panel 402 illustrated in FIG. 4 includes a tool bar 404, which enables a tester to perform actions related to test instructions. In some examples, the tool bar 404 may be displayed independent of the test instruction panel 402. For example, the tool bar 404 may be displayed when a tester moves a cursor over the subtitle bar 102. A tester may use the tool bar 404 to request a next or a previous test instruction, mark a test instruction as successfully completed, mark a test instruction as not successfully completed, mark a test instruction as untested, store a result of the test instruction performed on the application under test 104, and/or view a summary of a corresponding test script.

In some examples, the tool bar 404 includes a function that opens a settings panel to enable a tester to configure a display of the subtitle bar 102. An example settings panel is described in conjunction with FIG. 5. In some further examples, the tool bar 404 may enable a tester to begin recording a performance of the application under test 104 in response to the tester executing the test instructions. In yet further examples, the tool bar 404 may enable a tester to specify hotkeys on a keyboard for performing the functions provided within the tool bar 404 (e.g., keyboard arrow keys to navigate between test instructions).

Figure 5:
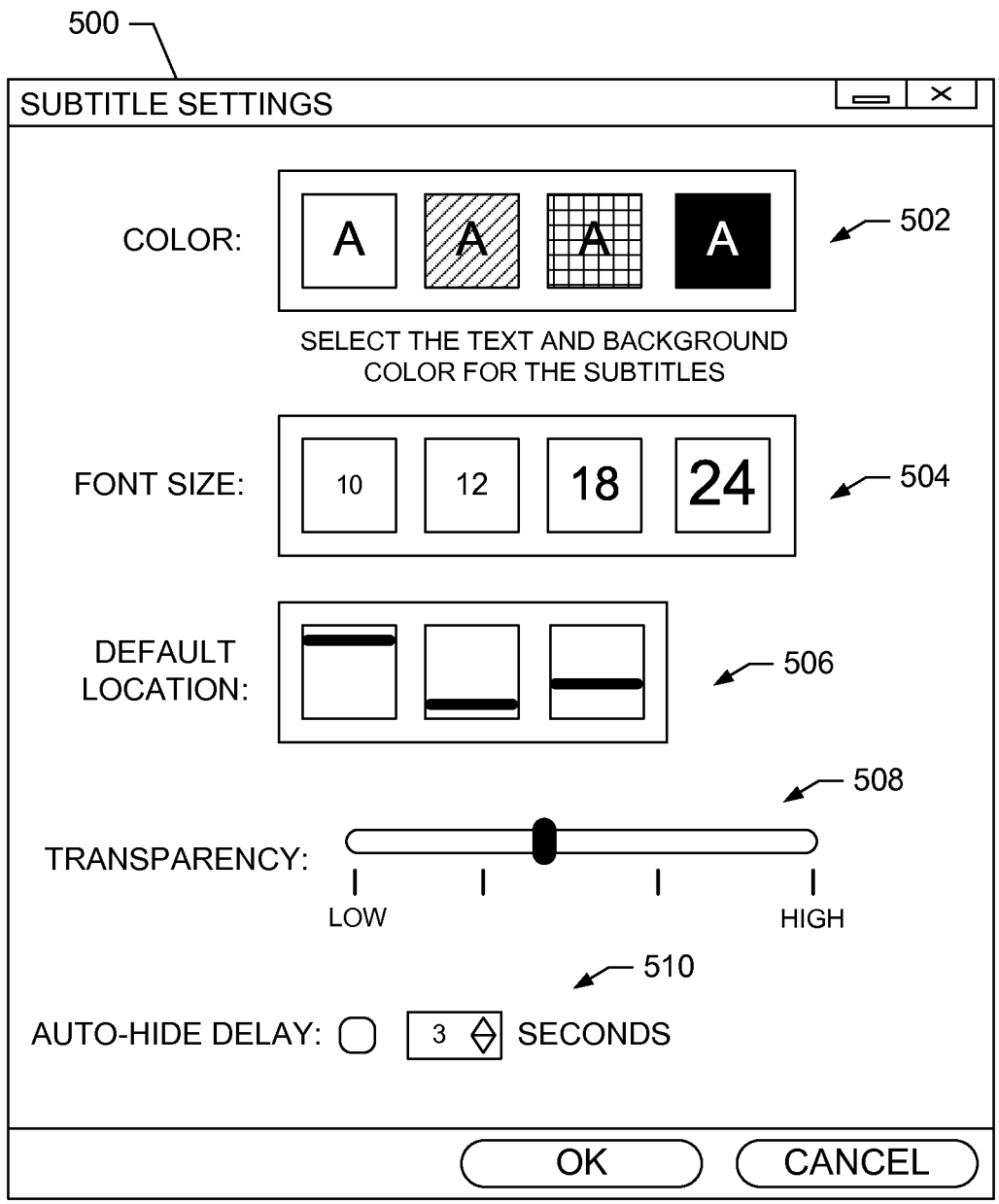
FIG. 5 shows an example settings panel that a tester may configure to change an appearance of the subtitle bar of FIGS. 1-4.

FIG. 5 illustrates an example settings panel 500 that a tester may configure to change an appearance of the subtitle bar 102 of FIGS. 1-4. The example settings panel 500 of FIG. 5 is displayed within the user interface 106 after a tester has selected a corresponding function within the tool bar 404 of FIG. 4. In some examples, the settings panel 500 additionally or alternatively includes a function that may be selected by a tester to cause the subtitle manager 110 to position the subtitle bar 102 in an empty portion of the application under test 104.

The settings panel 500 of the illustrated example includes a color property 502, a font size property 504, a default location property 506, a transparency property 508, and an auto-hide property 510. The color property 502 enables a tester to select a background color and a font color for the subtitle bar 102. The font size property 504 enables a tester to select a font size of text within the subtitle bar 102. The default location property 506 enables a tester to select a location within the user interface 106 to display the subtitle bar 102. In other examples, a tester may select an option for displaying the subtitle bar 102 within an empty portion of the application under test 104.

The example transparency property 508 of the illustrated example enables a tester to select a transparency level of the subtitle bar 102. The auto-hide property 510 of the illustrated example enables a tester to select a time period after which the subtitle manager 110 hides and/or removes the subtitle bar 102 from the user interface 106. Using this feature, a tester may view a test instruction prior to the subtitle bar 102 being removed and thereafter view the entire application under test 104 displayed within the user interface 106. In some examples, the subtitle manager 110 can redisplay the subtitle bar 102 when a tester moves a cursor over a location where the subtitle bar 102 was previously displayed.

When a tester selects the properties 502-510 within the settings panel 500, the subtitle manager 110 stores the properties 502-510 to a corresponding test script. Thus, when the tester later accesses the test script, the subtitle bar 102 is displayed by the subtitle manager 110 using the stored properties 502-510. In other examples, the properties 502-510 may be global for all of the test scripts and, thus, may be saved at a first time and thereafter applied irrespective of the test script being implemented.

Figure 6A:
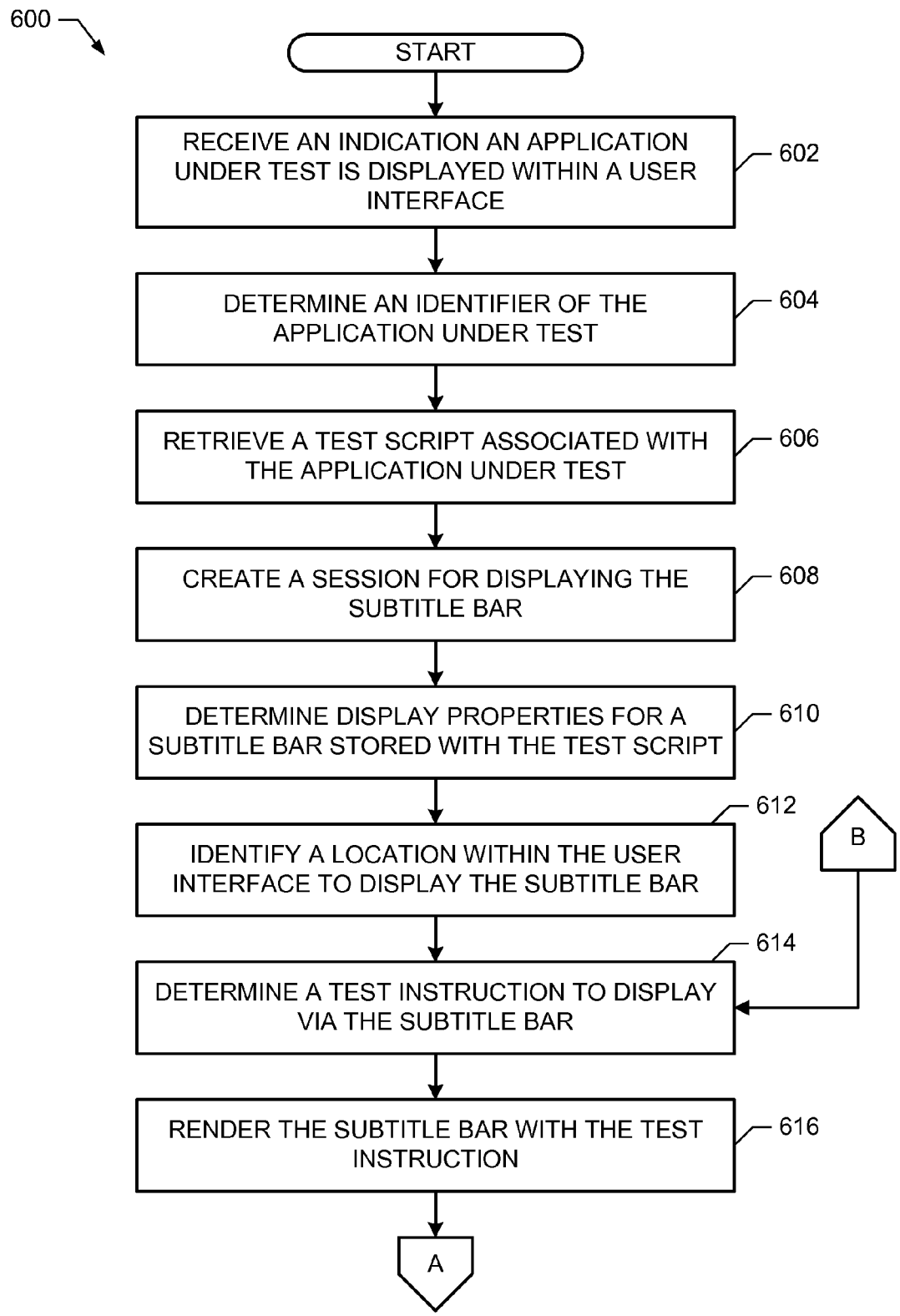
FIGS. 6A and 6B are flowcharts representative of example machine-accessible instructions, which may be executed to implement the example subtitle manager and/or system of FIG. 1.
Figure 6B:
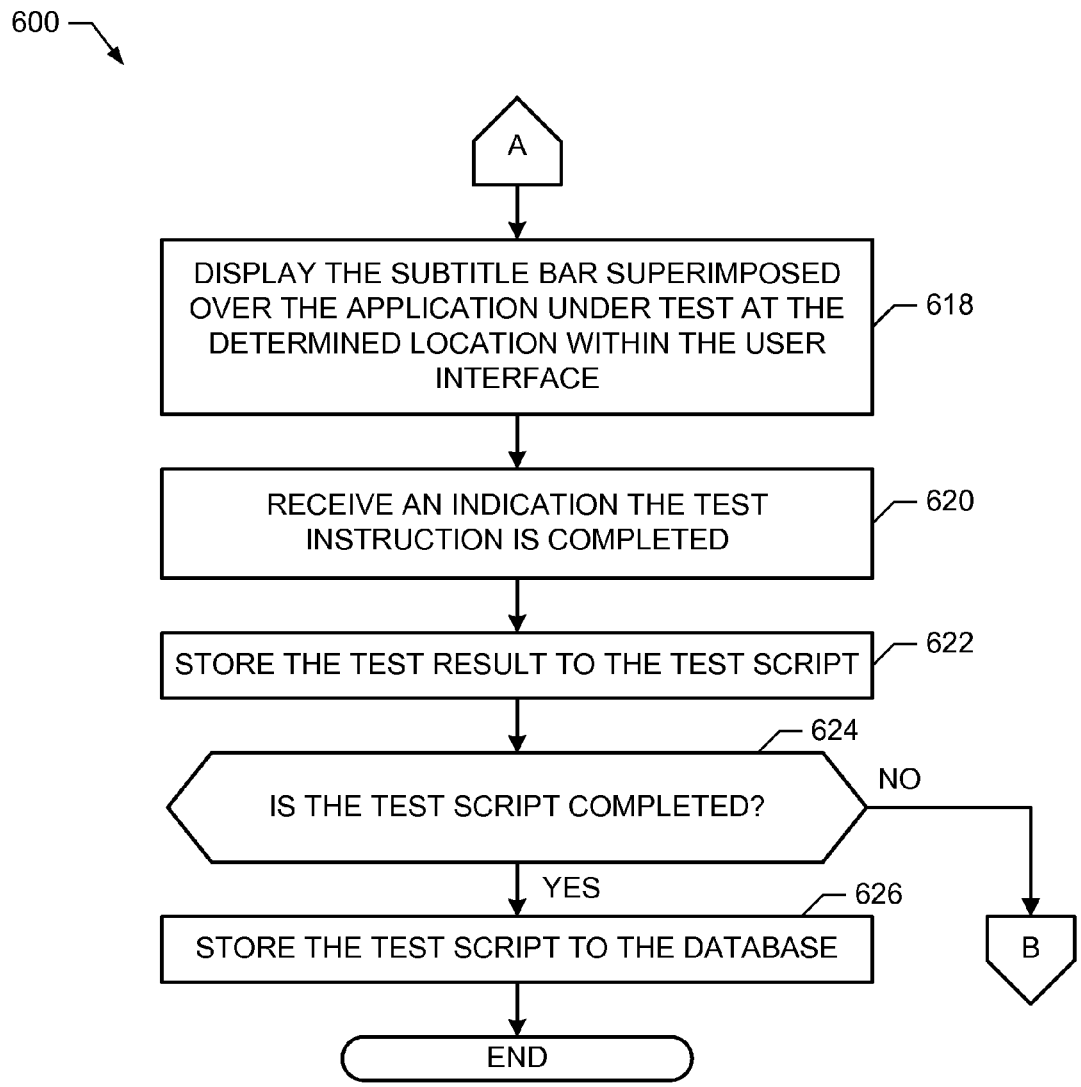

A flowchart representative of example machine readable instructions for implementing the subtitle manager 110 of FIG. 1 is shown in FIGS. 6A and 6B. In this example, the machine readable instructions comprise a program for execution by a processor such as the processor P105 shown in the example processor platform P100 discussed below in connection with FIG. 7. The program may be embodied in software stored on a computer readable medium such as a CD, a floppy disk, a hard drive, a DVD, Blu-ray disc, or a memory associated with the processor P105, but the entire program and/or parts thereof could alternatively be executed by a device other than the processor P105 and/or embodied in firmware or dedicated hardware. Further, although the example program is described with reference to the flowchart illustrated in FIGS. 6A and 6B, many other methods of implementing the example subtitle manager 110 may alternatively be used. For example, the order of execution of the blocks may be changed, and/or some of the blocks described may be changed, eliminated, or combined.

As mentioned above, the example processes of FIGS. 6A and 6B may be implemented using coded instructions (e.g., computer readable instructions) stored on a tangible computer readable medium such as a hard disk drive, a flash memory, a ROM, a CD, a DVD, a Blu-ray disc, a cache, a RAM and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 6A and 6B may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

The example machine-readable instructions 600 of FIG. 6A begin when the feedback processor 120 receives an indication that an application under test (e.g., the application under test 104) is displayed within a user interface (e.g., via the receiver 112) (block 602). The example application type identifier 116 then determines an identifier of the application under test (block 604). Using the identifier, the example test script retriever 122 retrieves a test script that matches and/or corresponds to the identifier (block 606).

The example session manager 126 then creates a session for displaying a subtitle bar (e.g., the subtitle bar 102) superimposed over the application under test (block 608). The example session manager 126 then determines display properties and/or settings for the subtitle bar that are specified within the test script (block 610). In other examples, the session manager 126 may access a global set of display properties to configure the subtitle bar.

The example session manager 126 next identifies a location within the user interface to display the subtitle bar (block 612). The location may be specified within the display settings or, alternatively, may be determined by identifying a sparsely populated, substantiality empty, void and/or empty space within the application under test. The example session manager 126 then determines a test instruction to display within the subtitle bar (block 614). Because, for purposes of illustrating, this is the first test instruction displayed, the example session manager 126 searches for the first test instruction listed within the test script. The example subtitle renderer 128 then renders the subtitle bar with the test instruction based on the display settings and/or properties (block 616).

As shown in FIG. 6B, the example subtitle renderer 128 then displays the subtitle bar superimposed over the application under test at the determined location within the user interface (block 618). The example feedback processor 120 may then receive an indication that the test instruction is completed (block 620). The indication may be provided by a tester or, alternatively, may be reported by the application under test. The example feedback processor 120 stores the test result to the test script and/or a test log (block 622).

The example feedback processor 120 then determines if the test script is complete (block 624). If the test script is not complete, the example feedback processor 120 determines the next test instruction (block 614). However, if the test script is complete, the example feedback processor 120 stores the test script and/or the test log to the test script database 124 (block 626). The example machine-readable instructions 600 may then terminate.

Figure 7:
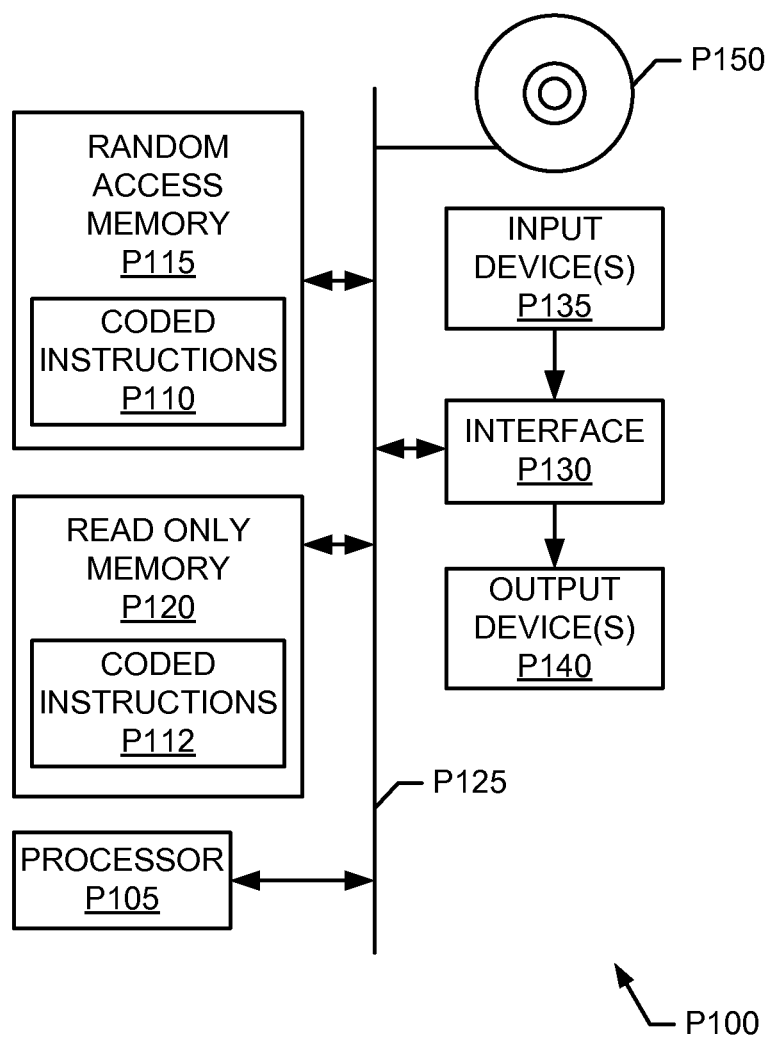
FIG. 7 is a schematic illustration of an example processor platform that may be used and/or programmed to execute the example processes and/or the example machine-accessible instructions of FIGS. 6A and 6B to implement any or all of the example methods, apparatus and/or articles of manufacture described herein.

FIG. 7 is a schematic diagram of an example processor platform P100 that may be used and/or programmed to execute the example machine readable instructions 600 of FIGS. 6A and 6B. One or more general-purpose processors, processor cores, microcontrollers, etc may be used to implement the processor platform P100.

The processor platform P100 of FIG. 7 includes at least one programmable processor P105. The processor P105 may implement, for example, the example workstation 108, the example subtitle manager 110, the example receiver 114, the example application type identifier 116, the example subtitle configurer 118, the example feedback processor 120, the example test script retriever 122, the example session manager 126, and/or the example subtitle renderer 128 of FIG. 1. The processor P105 executes coded instructions P110 and/or P112 present in main memory of the processor P105 (e.g., within a RAM P115 and/or a ROM P120) and/or stored in the tangible computer-readable storage medium P150. The processor P105 may be any type of processing unit, such as a processor core, a processor and/or a microcontroller. The processor P105 may execute, among other things, the example interactions and/or the example machine-accessible instructions 600 of FIGS. 6A and/or 6B to transfer files, as described herein. Thus, the coded instructions P110, P112 may include the instructions 600 of FIGS. 6A and/or 6B.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. The tangible computer-readable memory P150 may be any type of tangible computer-readable medium such as, for example, compact disk (CD), a CD-ROM, a floppy disk, a hard drive, a digital versatile disk (DVD), and/or a memory associated with the processor P105. Access to the memory P115, the memory P120, and/or the tangible computer-medium P150 may be controlled by a memory controller.

The processor platform P100 also includes an interface circuit P130. Any type of interface standard, such as an external memory interface, serial port, general-purpose input/output, etc, may implement the interface circuit P130. One or more input devices P135 and one or more output devices P140 are connected to the interface circuit P130.

Although the above described example methods, apparatus, and articles of manufacture including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the above described example methods, apparatus, and articles of manufacture, the examples provided herein are not the only way to implement such methods, apparatus, and articles of manufacture. For example, while the example methods, apparatus, and articles of manufacturer have been described in conjunction with file systems, mount points, and/or file directories, the example methods, apparatus, and/or article of manufacture may operate within any structure that stores data.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent either literally or under the doctrine of equivalents.

What is claimed is:

1. A method, comprising:
   selecting a test script that corresponds to an application; and
   superimposing a subtitle bar including a test instruction from the test script over a location of a display of the application, the location of the subtitle bar determined to reduce interference with using the application, wherein the test instruction provides an action a user is to perform to test the application, the location of the subtitle bar being determined to permit the user to read the test instruction while performing the action indicated by the test instruction on the application.

2. A method as defined in claim 1, wherein a height of the subtitle bar is at most one fifteenth of a height of the application within the user interface.

3. A method as defined in claim 1, wherein a width of the subtitle bar is equal to a width of the application and the subtitle bar is located at a bottom of the application within the user interface.

4. A method as defined in claim 1, further comprising:
   receiving a setting associated with the subtitle bar; and
   rendering the subtitle bar to be displayed superimposed over the application with the selected setting.

5. A method as defined in claim 4, wherein the setting includes at least one of a text color, a text background color, a subtitle bar location within the user interface, or a transparency of the subtitle bar.

6. A method as defined in claim 1, further comprising removing the subtitle bar from view of the user after a time period specified by the user.

7. A method as defined in claim 1, further comprising:
   receiving an indication the user has performed the action;
   determining a next test instruction from the test script based on the performed action; and
   replacing the test instruction with the next test instruction within the subtitle bar.

8. An apparatus, comprising:
   a test script receiver to select a test script that corresponds to an application under test, the test script to provide an instruction that a user is to perform to test the application;
   a session manager to determine a location of a subtitle bar to reduce interference with using the application; and
   a subtitle renderer to superimpose the subtitle bar including a test instruction from the test script within the determined location, the location determined to permit the user to read the test instruction while performing the action indicated by the test instruction on the application,
   at least one of the test script receiver, the session manager, or the subtitle renderer being implemented via a logic circuit.

9. An apparatus as defined in claim 8, wherein the session manager is to determine the location by identifying the location within the user interface that does not include a graphical representation of data displayed via the application.

10. An apparatus as defined in claim 8, further comprising a feedback processor to:
    receive an indication the user has performed the test instruction; and
    determine a next test instruction from the test script based on the performed test instruction.

11. An apparatus as defined in claim 10, wherein the session manager is to replace the test instruction with the next test instruction within the subtitle bar.

12. An apparatus as defined in claim 8, further comprising a subtitle configurer to:
    receive a setting associated with the subtitle bar; and
    send an instruction to the subtitle renderer to display the subtitle bar superimposed over the application in accordance with the selected setting.

13. An apparatus as defined in claim 8, wherein the session manager is to remove the subtitle bar from the view of the user after a time period.

14. A tangible article of manufacture comprising machine-readable instructions that, when executed, cause a machine to at least:
    select a test script that corresponds to an application to test; and
    superimpose a subtitle bar including a test instruction from the test script at a first location on a display of the application, the location of the subtitle bar determined to reduce interference with using the application, the test instruction to provide a synopsis of an action, the location of the subtitle bar being determined to permit the user to read the test instruction while performing the action indicated by the test instruction on the application.

15. A tangible article of manufacture as defined in claim 14, wherein the machine-readable instructions, when executed, further cause the machine to:
    determine the display of the application has changed; and
    move the subtitle bar to a different second location on the display that does not interfere with using the application.

16. A tangible article of manufacture as defined in claim 14, wherein the machine-readable instructions, when executed, further cause the machine to:
   determine the user performed the test instruction correctly;
   store an indicator within the test script indicating the test instruction was performed correctly;
   determine a next test instruction from the test script based on the performed action; and
   replace the test instruction with the next test instruction within the subtitle bar.

17. A tangible article of manufacture as defined in claim 14, wherein the machine-readable instructions, when executed, further cause the machine to remove the subtitle bar after a time period.

18. A tangible article of manufacture as defined in claim 14, wherein the machine-readable instructions, when executed, further cause the machine to record a result from the application based on the user performing the test instruction.

19. A tangible article of manufacture as defined in claim 14, wherein the machine-readable instructions, when executed, further cause the machine to display a test instruction panel after a user selects the subtitle bar, the test instruction panel including additional information for a user to perform the test instruction.

20. A tangible article of manufacture as defined in claim 14, wherein the machine-readable instructions, when executed, further cause the machine to:
   receive a setting associated with the subtitle bar; and
   render the subtitle bar to be displayed superimposed over the application in accordance with the setting.

* * * * *